(12) United States Patent
Walma et al.

(10) Patent No.: US 8,340,834 B1
(45) Date of Patent: Dec. 25, 2012

(54) OCCUPANCY SENSOR WITH ENERGY USAGE INDICATOR

(75) Inventors: Kenneth Walma, Peachtree City, GA (US); Matthew Conger, East Point, GA (US); Angela Maddox, Newnan, GA (US)

(73) Assignee: Cooper Technologies Company, Houston, TX (US)

( * ) Notice: Subject to any disclaimer, the term of this patent is extended or adjusted under 35 U.S.C. 154(b) by 279 days.

(21) Appl. No.: 12/762,021

(22) Filed: Apr. 16, 2010

(51) Int. Cl.
*G05B 11/01* (2006.01)

(52) U.S. Cl. ........................................ 700/295; 700/286

(58) Field of Classification Search .................. 700/275, 700/286, 295; 315/149, 291, 312; 340/657
See application file for complete search history.

(56) References Cited

U.S. PATENT DOCUMENTS

| | | | | |
|---|---|---|---|---|
| 5,406,173 A * | 4/1995 | Mix et al. | | 315/156 |
| 5,758,040 A * | 5/1998 | Ichimura et al. | | 358/1.14 |
| 5,929,943 A * | 7/1999 | Bell et al. | | 348/730 |
| 6,054,981 A * | 4/2000 | Kimoto et al. | | 345/211 |
| 6,268,845 B1 * | 7/2001 | Pariza et al. | | 345/581 |
| 6,289,466 B1 * | 9/2001 | Bayramoglu et al. | | 713/310 |
| 6,353,893 B1 * | 3/2002 | Liu et al. | | 713/323 |
| 6,583,573 B2 * | 6/2003 | Bierman | | 315/149 |
| 6,661,398 B2 * | 12/2003 | Iwasaki | | 345/82 |
| 6,801,836 B2 * | 10/2004 | Schanin | | 700/295 |
| 7,045,975 B2 * | 5/2006 | Evans | | 315/312 |
| 7,067,992 B2 * | 6/2006 | Leong et al. | | 315/291 |
| 7,355,349 B2 * | 4/2008 | Evans | | 315/149 |
| 7,948,189 B2 * | 5/2011 | Ahmed | | 315/291 |
| 8,049,427 B2 * | 11/2011 | Altonen et al. | | 315/291 |
| 2001/0045944 A1 * | 11/2001 | Iwasaki | | 345/204 |
| 2003/0009264 A1 * | 1/2003 | Schanin | | 700/291 |
| 2003/0090210 A1 * | 5/2003 | Bierman | | 315/149 |
| 2004/0240167 A1 * | 12/2004 | Ledbetter et al. | | 361/683 |
| 2007/0290630 A1 * | 12/2007 | Kim | | 315/308 |
| 2008/0111500 A1 * | 5/2008 | Hoover | | 315/293 |
| 2008/0209241 A1 * | 8/2008 | Huang | | 713/310 |
| 2010/0164736 A1 * | 7/2010 | Byers et al. | | 340/657 |

* cited by examiner

*Primary Examiner* — Charles Kasenge
(74) *Attorney, Agent, or Firm* — King & Spalding LLP

(57) ABSTRACT

An occupancy sensing and energy indicating load control device includes an occupancy sensor, an energy savings feedback indicator, and a manual controller. The occupancy sensor detects occupancy within a monitored area. The device is electrically coupled to at least one load positioned within the monitored area and controls the energy consumption of the load. The energy savings feedback indicator provides awareness to an end user regarding energy savings and provides the end user with opportunities for additional energy savings. The device optionally includes a demand response indicator for providing awareness to the end user regarding when a demand response condition exists, its severity, and opportunities for additional energy savings.

30 Claims, 5 Drawing Sheets

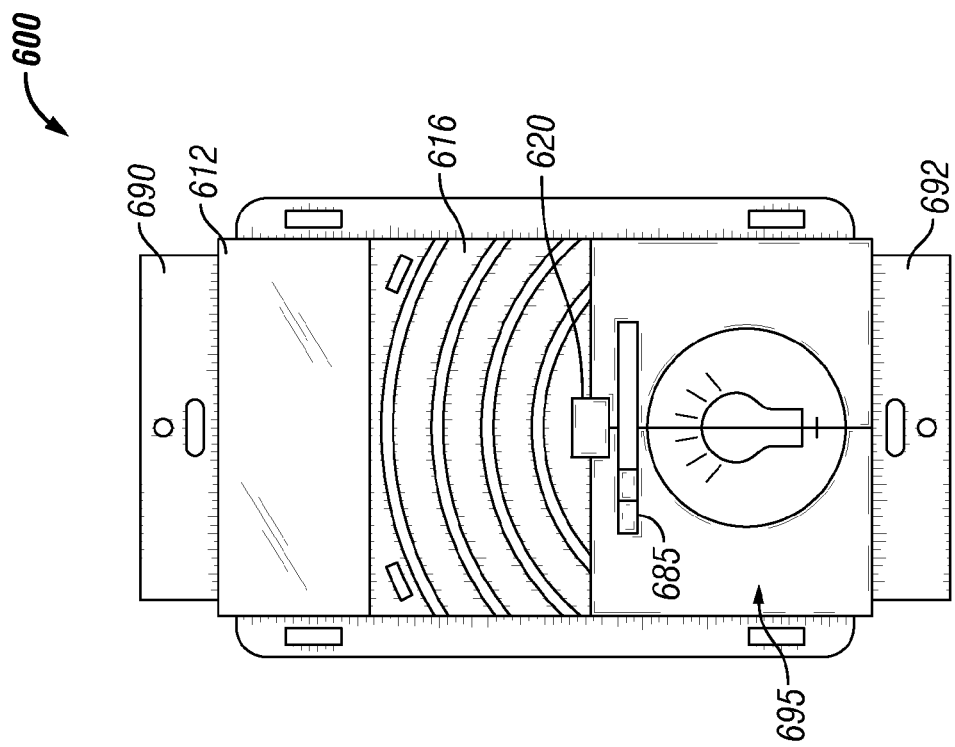
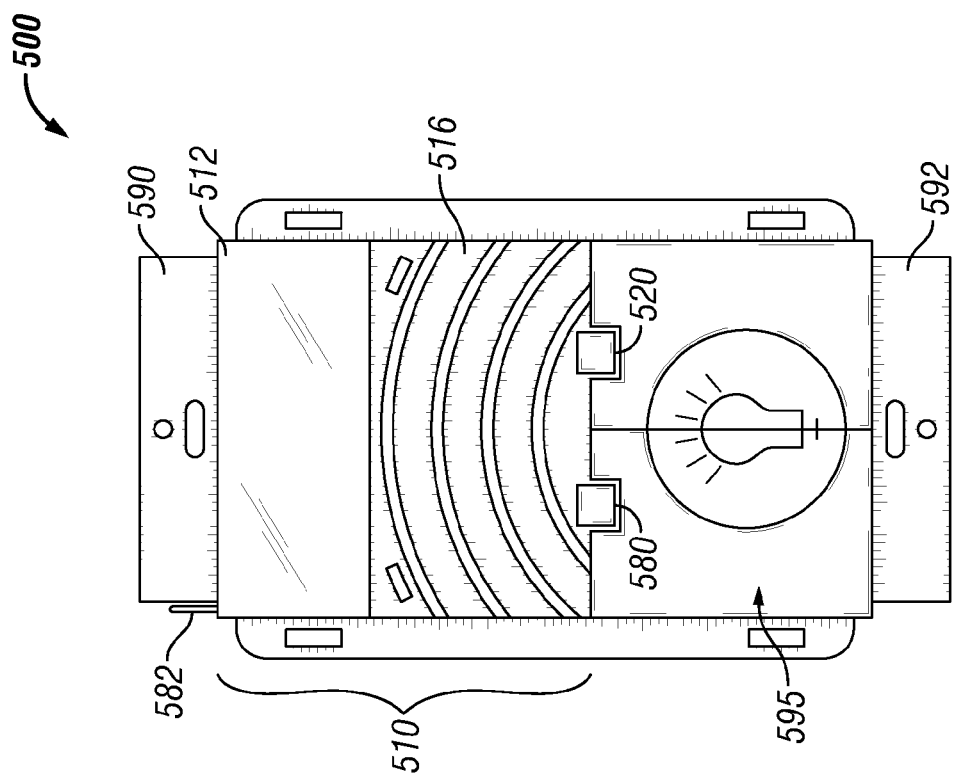

OCCUPANCY SENSOR WITH ENERGY USAGE INDICATOR

TECHNICAL FIELD

The present invention relates generally to electrical wiring devices. More specifically, the present invention relates to electrical wiring devices that provide feedback on energy usage to an end user.

BACKGROUND

World net electricity consumption will nearly double from 2003 to 2030 according to the Energy Information Administration of the U.S. Department of Energy. Much of the electricity is expected to be used for providing lighting to industrial, commercial, and residential areas. There generally has been a trend to conserve electricity in lighting applications. The adoption of energy-efficient technologies help conserve electricity, thereby slowing the growth in both the "base demand" and "peak demand," which are both components of the overall electricity demand. Base demand is the average demand for electricity, while peak demand occurs when the demand for electricity is the greatest. Reducing either type of demand is desirable, but a reduction in peak demand generally is more valuable because of the relatively high unit cost of the capacity required to provide the peak demand.

Many facilities, such as commercial, residential, industrial, institutional, and warehouse facilities, typically use or are being modified to use more energy-efficient lighting devices. For example, high intensity fluorescent ("HIF") light sources consume less electricity in comparison to other less efficient types of light sources, such as incandescent and high intensity discharge ("HID") bulbs. In another example, light emitting diodes ("LEDs") consume less electricity than a HIF light source.

Many facilities also attempt to reduce electricity consumption by using additional energy-saving technologies, such as occupancy sensors. Occupancy sensors monitor a desired area to determine if the area is being occupied by a person and are capable of controlling the on/off functions of lighting and/or other electrical devices, such as heating, ventilating, and air conditioning ("HVAC") units and other devices that consume electricity. In some examples, the occupancy sensor sends a signal to the lighting devices to turn on one or more of the lights in the monitored area when the monitored area is occupied. The occupancy sensor sends a signal to the lighting devices to turn off one or more of the lights in the monitored area when the monitored area becomes unoccupied or when no motion is detected for a predetermined period of time.

SUMMARY

According to one exemplary embodiment of the invention, a lighting control device can include a microcontroller, an occupancy sensor, and an energy savings feedback indicator. The occupancy sensor can be communicably coupled to the microcontroller. The occupancy sensor can sense occupancy within a monitored area and send a first signal to the microcontroller once the occupancy sensor detects occupancy. The microcontroller can turn on one or more loads when occupancy is detected within the monitored area. The energy feedback indicator also can be communicably coupled to the microcontroller and receive a second signal from the microprocessor, which is dependent upon the amount of energy savings occurring. The energy savings feedback indicator can provide energy savings information to an end user.

According to another exemplary embodiment of the invention, a lighting control system can include at least one load positioned within a monitored area and a lighting control device electrically coupled to at least one load. The lighting control device can include a microcontroller, an occupancy sensor, and an energy savings feedback indicator. The occupancy sensor can be communicably coupled to the microcontroller. The occupancy sensor can sense occupancy within a monitored area and sends a first signal to the microcontroller once the occupancy sensor detects occupancy. The microcontroller can turn on one or more loads when occupancy is detected within the monitored area. The energy feedback indicator also can be communicably coupled to the microcontroller and receive a second signal from the microprocessor, which is dependent upon the amount of energy savings occurring. The energy savings feedback indicator can provide energy savings information to an end user.

According to another exemplary embodiment of the invention, a method for determining a level of energy savings in a lighting control system can include electrically coupling a lighting control device to one or more loads and providing an indication of energy savings on the device to an end user based upon an amount of electricity that is being saved. The lighting control device can include a microcontroller, an occupancy sensor, and an energy savings feedback indicator. The occupancy sensor can be communicably coupled to the microcontroller. The occupancy sensor can sense occupancy within a monitored area and sends a first signal to the microcontroller once the occupancy sensor detects occupancy. The microcontroller can turn on one or more loads when occupancy is detected within the monitored area. The energy feedback indicator also can be communicably coupled to the microcontroller and receive a second signal from the microprocessor, which is dependent upon the amount of energy savings occurring. The energy savings feedback indicator can provide energy savings information to the end user.

BRIEF DESCRIPTION OF THE DRAWINGS

The foregoing and other features and aspects of the invention are best understood with reference to the following description of certain exemplary embodiments, when read in conjunction with the accompanying drawings, wherein:

FIG. 5 is a front elevation view of an alternative lighting control device in accordance with another exemplary embodiment of the present invention;

FIG. 6 is a front elevation view of another alternative occupancy sensing and energy indicating lighting control device in accordance with another exemplary embodiment of the present invention.

Figure 1B:
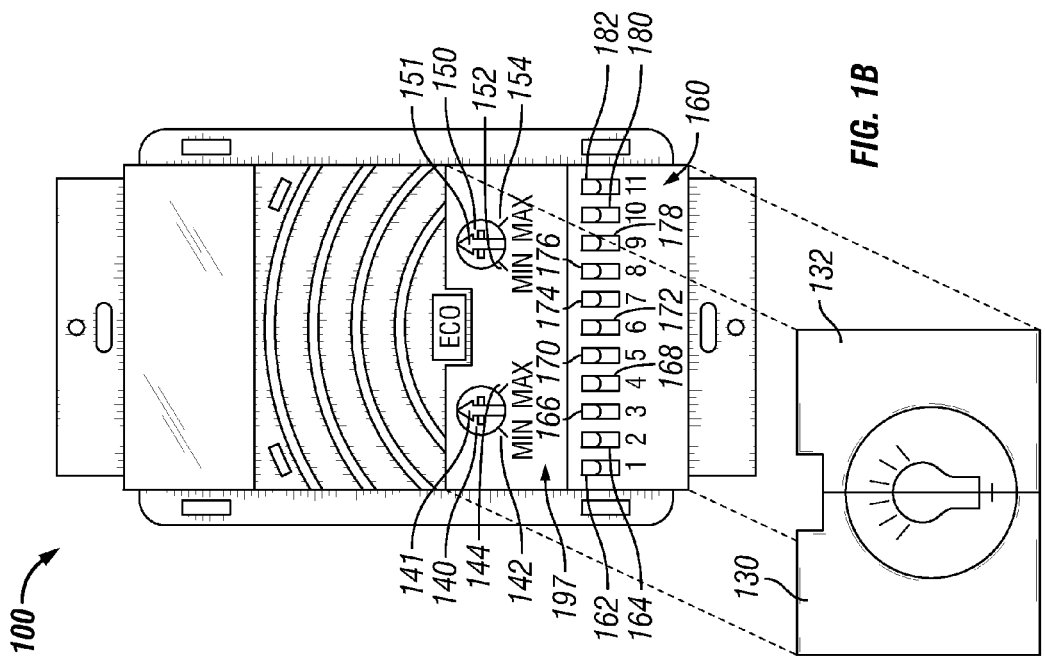
FIG. 1B is a partially exploded view of the lighting control device of FIG. 1A in accordance with an exemplary embodiment of the present invention.

The drawings illustrate only exemplary embodiments of the invention and are therefore not to be considered limiting of its scope, as the invention may admit to other equally effective embodiments.

BRIEF DESCRIPTION OF EXEMPLARY EMBODIMENTS

The present invention is directed to electrical wiring devices that provide a visual indication of energy usage. Although the description of exemplary embodiments is provided below in conjunction with lighting control devices including, but not limited to, switches and dimmers, alternate embodiments of the invention are applicable to other types of electrical wiring devices including, but not limited to, electrical receptacles and other load control devices. The load control devices control electricity supplied to one or more loads, including, but not limited to, HVACs, lighting loads, and any other load that consumes electricity. The invention is better understood by reading the following description of non-limiting, exemplary embodiments with reference to the attached drawings, wherein like parts of each of the figures are identified by like reference characters, and which are briefly described as follows.

Figure 1A:
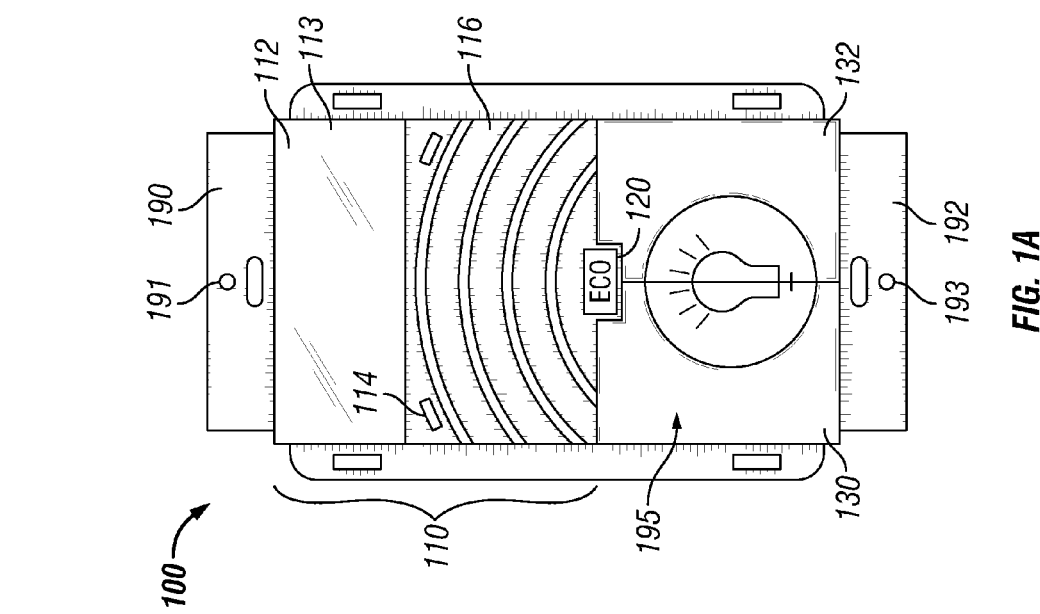
FIG. 1A is a front elevation view of a lighting control device in accordance with an exemplary embodiment of the present invention.

FIG. 1A is a front elevation view of a lighting control device 100 in accordance with an exemplary embodiment of the present invention. FIG. 1B is a partially exploded view of the lighting control device 100 of FIG. 1A. Referring to FIGS. 1A and 1B, the lighting control device 100 includes an upper coupling band 190, a lower coupling band 192, an occupancy sensor 110, an energy savings feedback indicator 120, and a manual controller 195. According to some exemplary embodiments, the lighting control device 100 also includes a setting controller 197 disposed behind the removable manual controller 195. The occupancy sensor 110, the energy savings feedback indicator 120, and the manual controller 195 are positioned between the upper coupling band 190 and the lower coupling band 192. According to one exemplary embodiment, the energy savings feedback indicator 120 is disposed adjacent the occupancy sensor 110 and the manual controller 195. The occupancy sensor 110 is positioned adjacent the upper coupling band 190, while the manual controller 195 is positioned adjacent the lower coupling band 192. Although the positioning of the occupancy sensor 110, the energy savings feedback indicator 120, and the manual controller 195 has been provided in accordance with one of the exemplary embodiments, other exemplary embodiments have alternative positioning of the occupancy sensor 110, the energy savings feedback indicator 120, and the manual controller 195 without departing from the scope and spirit of the exemplary embodiment.

The upper coupling band 190 and the lower coupling band 192 are substantially the same as conventional coupling bands in the art used to couple the lighting control device 100 to a wall box (not shown). The occupancy sensor 110 is able to activate upon sensing the occupancy of the monitored area, maintain activation when sensing continuing occupancy of the monitored area, and enable settings for operating the occupancy sensor 110. The occupancy sensor 110 includes a passive infrared ("PIR") sensor section 112 and an ultrasonic sensor section 116. Although the occupancy sensor 110 includes both the PIR sensor section 112 and the ultrasonic sensor section 116, the occupancy sensor 110 can include any one or a combination of different occupancy sensing technologies including, but not limited to, PIR, ultrasonic, microwave, and microphonic technologies.

The PIR sensor section 112 passively senses the occupancy of the monitored area, activates a signal upon detecting occupancy, continues activating the signal upon sensing the continuing occupancy of the monitored area, enables settings for operating the PIR sensor section 112, and enables separate processing of the settings for only the PIR sensor section 112. The PIR sensor section 112 utilizes a passive technology, which does not send out a signal to aid in the reception of a signal. A Fresnel lens 113 is positioned to encompass one or more PIR sensors (not shown) that are located within the PIR sensor section 112. The use of PIR sensors for determining occupancy in a monitored area are known to people having ordinary skill in the art.

The ultrasonic sensor section 116 actively senses the occupancy of the monitored area, activates a signal upon sensing the continuing occupancy of the monitored area, enables settings for operating the ultrasonic sensor section 116, and enables separate processing of the settings for only the ultrasonic sensor section 116. The ultrasonic sensor section 116 utilizes an active technology, which sends out a reference signal which is compared to the received signal in order to determine if a change has occurred. The use of ultrasonic sensors for determining occupancy in a monitored area are known to people having ordinary skill in the art.

In summary, the occupancy sensor 110 activates when the PIR sensor section 112 senses occupancy of the area and maintains activation when either the PIR sensor section 112 or the ultrasonic sensor section 116 senses continuing occupancy of the area. The signals in the PIR sensor section 112 and the ultrasonic sensor section 116 are each independently activated and form independent signals. The independent PIR sensor section signal and the independent ultrasonic sensor section signal are not combined to form a composite signal. However, in alternative exemplary embodiments, at least a portion of the independent PIR sensor section signal and at least a portion of the independent ultrasonic sensor section signal are combined to form a composite signal. The occupancy sensor 110 is able to maintain activation when both the PIR sensor section 112 and the ultrasonic sensor section 116 are independently activated and form independent signals. The programming and electronics associated with operating occupancy sensors are known to people having ordinary skill in the art. For example, U.S. Pat. No. 7,411,489 (the "'489 patent"), issued to Elwell et al. on Aug. 12, 2008, discloses a system and method for operating a self-adjusting dual technology occupancy sensor. The teachings disclosed in the '489 patent are incorporated by reference herein, in its entirety.

In some exemplary embodiments, the occupancy sensor 110 includes an occupancy sensor indicator 114. The occupancy sensor indicator 114 is located within the ultrasonic sensor section 116 and is a bi-color LED indicator. The occupancy sensor indicator 114 provides information to the end user as to which section of the occupancy sensor 110 detected motion within the monitored area. In alternative exemplary embodiments, other methods, such as using two independent LEDs, can be used to show which section of the occupancy sensor 110 detected motion within the monitored area. The occupancy sensor indicator 114 emits a red light to indicate motion detection by the PIR sensor section 112 and a green light to indicate motion detection by the ultrasonic sensor section 116. However, the emitted light may be a different color than those described in other exemplary embodiments. Additionally, the occupancy sensor indicator 114 can be included within a display screen, such as a liquid crystal display ("LCD") screen, an organic light emitting diode ("OLED") display screen, or any other display screen using electroluminescent material, and include one of text, symbols, growing objects, numbers, and any combinations thereof.

The energy savings feedback indicator 120 includes an LED and a lens positioned over the LED. The LED emits shades of green light to indicate levels of energy savings associated with lighting fixtures, or loads, electrically coupled to the occupancy sensing and energy indicating lighting control device 100. For example, the occupancy sensing and energy indicating lighting control device 100 has two relays, wherein each relay controls the lights to one or more corresponding light fixtures. When all lights are off for all the corresponding light fixtures, the energy savings feedback indicator 120 emits a bright green light. This bright green light informs the end user that energy savings is at its maximum. When all the lights in light fixtures that correspond with one relay are off and all the lights in light fixtures that correspond with the other relay are on, the energy savings feedback indicator 120 emits a medium shade of green light. This medium shade of green light informs the end user that energy savings is at about half the maximum energy savings. In certain exemplary embodiments, this medium shade of green light has an intensity that is about one-half the intensity of the bright green light. When all the lights in light fixtures that correspond with both relays are on at full intensity, the energy savings feedback indicator 120 emits no light or a very faint shade of green light. This no light or very faint shade of green light informs the end user that minimal to no energy savings is occurring. Additionally, the energy savings feedback indicator 120 emits a variety of shades of green light for energy savings occurring at any intermediate point between one hundred percent energy savings and zero percent energy savings. According to some exemplary embodiments, the energy savings feedback indicator 120 emits light at an intensity that is proportional to the energy savings that is occurring. Although an LED emitting shades of green light has been described for communicating different levels of energy savings, any color of light and its respective shades can be used without departing from the scope and spirit of the exemplary embodiment. Hence, the energy savings feedback indicator 120 provides awareness to the end user regarding energy savings and provides the end user with opportunities for additional energy savings. Additionally, the energy savings feedback indicator 120 also behaves as a night light for locating the occupancy sensing and energy indicating lighting control device 100 when all the lights in the monitored area are off. As previously mentioned, the energy savings feedback indicator 120 emits a bright green light when all the lights associated with the occupancy sensing and energy indicating lighting control device 100 are off.

Although the energy savings feedback indicator 120 has been described as including an LED emitting shades of green light according to one exemplary embodiment, the energy savings feedback indicator 120 includes one or more LEDs capable of emitting the full spectrum of visible light, or a portion of the full spectrum of visible light, through the lens in accordance with other exemplary embodiments. The color of the emitted light is dependent upon the amount of energy savings that is occurring at that moment in time. For example, the energy savings feedback indicator 120 emits a green light representing a high degree of energy savings, a yellow light representing a high intermediate degree of energy savings, an orange light representing a low intermediate degree of energy savings, and a red light representing a low degree of energy savings or no energy savings. Although representative colors have been described for different levels of energy savings, any color or shades of color can represent different levels of energy savings without departing from the scope and spirit of the exemplary embodiment.

Although the energy savings feedback indicator 120 has been described as including an LED emitting shades of a single light color or one or more LEDs emitting the full spectrum of visible light, or a portion of the full spectrum of visible light, through the lens according to some of the exemplary embodiments, the energy savings feedback indicator 120 can include a display screen, such as a LCD screen, an OLED display screen, or any other display screen using electroluminescent material, for communicating energy savings or energy consumption information to the end user. For example, the display screen can display one or more words, one or more numbers, one or more symbols, one or more growing objects, or a combination of the aforementioned. In one example, the growing object can be a tree. When the tree has all its leaves, the energy savings is at its highest and the lights associated with the occupancy sensing and energy indicating lighting control device 100 are all off. When the tree has no leaves, the energy savings is at its lowest and the lights associated with the occupancy sensing and energy indicating lighting control device 100 are all on at their fullest intensity. Similar to the previous example for communicating intermediate levels of energy savings, the tree can have variable amounts of leaves displayed for indicating different levels of energy savings. The more leaves that are displayed corresponds to a higher degree of energy savings. According to still yet other exemplary embodiments, the energy savings feedback indicator 120 can be a device that produces an audible sound, in lieu of or in addition to the visible indicators previously described, to indicate different levels of energy savings.

Figure 2:
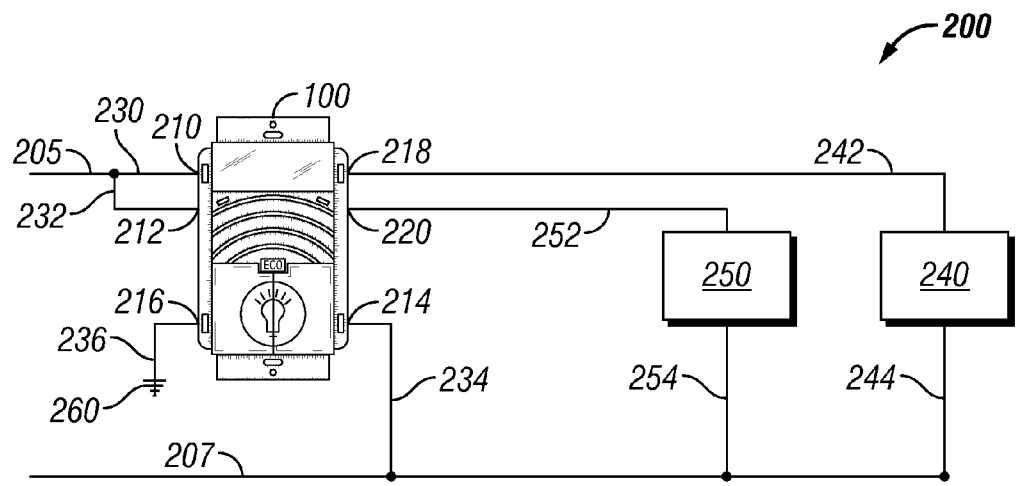
FIG. 2 is a schematic block diagram of a dual level single circuit wiring diagram incorporating the lighting control device of FIG. 1A in accordance with an exemplary embodiment of the present invention.

The manual controller 195 adjusts the desired light level of the light fixtures, or loads, electrically coupled to the occupancy sensing and energy indicating lighting control device 100. The manual controller 195 includes a first on/off button 130 and a second on/off button 132 according to one exemplary embodiment. The first on/off button 130 and the second on/off button 132 are integrally formed as one piece; however, according to alternative exemplary embodiments, the first on/off button 130 and the second on/off button 132 are separately formed. Although the exemplary embodiment illustrates that the manual controller 195 includes a first on/off button 130 and a second on/off button 132, fewer or more on/off buttons can be used depending upon the number of loads that are associated with the occupancy sensing and energy indicating lighting control device 100 without departing from the scope and spirit of the exemplary embodiment. Alternatively, although the manual controller 195 includes on/off buttons 130 and 132 in some exemplary embodiments, the manual controller 195 can be any type of controller that controls the desired light level including, but not limited to, a switch, a dimmer, and a slide. The first on/off button 130 is associated with a first relay and controls the desired light level associated with a first load 240 (FIG. 2). When the first on/off button 130 is in the on position, the lights associated with the first load 240 (FIG. 2) are on. Conversely, when the first on/off button 130 is in the off position, the lights associated with the first load 240 (FIG. 2) are off. Similarly, the second on/off button 132 is associated with a second relay and controls the desired light level associated with a second load 250 (FIG. 2). When the second on/off button 132 is in the on position, the lights associated with the second load 250 (FIG. 2) are on. Conversely, when the second on/off button 132 is in the off position, the lights associated with the second load 250 (FIG. 2) are off. According to alternative exemplary embodiments, the dimmer allows for intermediate levels of illumination emitting from the loads.

The manual controller 195 is removable to allow the end user access to the setting controller 197, which is disposed behind the manual controller 195. The setting controller 197 includes a daylight sensor level adjuster 140, an ultrasonic sensitivity level adjuster 150, and a dipswitch panel 160 including one or more dipswitches 162, 164, 166, 168, 170, 172, 174, 176, 178, 180, and 182. Although eleven dipswitches 162, 164, 166, 168, 170, 172, 174, 176, 178, 180, and 182 are included in the dipswitch panel 160, greater or fewer dipswitches can be included within the dipswitch panel 160 depending upon the different parameters that are desired to be controlled. Similarly, although some exemplary embodiments include both the daylight sensor level adjuster 140 and the ultrasonic sensitivity level adjuster 150, other exemplary embodiments include either or none of the daylight sensor level adjuster 140 and the ultrasonic sensitivity level adjuster 150.

The daylight sensor level adjuster 140 and the ultrasonic sensitivity level adjuster 150 are positioned above the dipswitch panel 160; however the positioning of the daylight sensor level adjuster 140 and the ultrasonic sensitivity level adjuster 150 can be along other portions of the occupancy sensing and energy indicating lighting control device 100 in general. Additionally, although the daylight sensor level adjuster 140 and the ultrasonic sensitivity level adjuster 150 are rotating knobs, the daylight sensor level adjuster 140 and the ultrasonic sensitivity level adjuster 150 can have another shape or form, such as a sliding switch or a push button without departing from the scope and spirit of the exemplary embodiment. According to the exemplary embodiment shown in FIGS. 1A and 1B, the daylight sensor level adjuster 140 and the ultrasonic sensitivity level adjuster 150 are adjusted by rotating, either clockwise or counter-clockwise, as the situation requires. Further, in this exemplary embodiment, the daylight sensor level adjuster 140 includes a receptacle 141, which is capable of receiving a Philips-head or other known type of screwdriver, thereby facilitating the adjustment of the daylight sensor level adjuster 140. Similarly, the ultrasonic sensitivity level adjuster 150 includes a receptacle 151, which is capable of receiving a Philips-head or other known type of screwdriver, thereby facilitating the adjustment of the ultrasonic sensitivity level adjuster 150.

The exemplary daylight sensor level adjuster 140 controls the sensitivity of a daylighting feature and is indicated by a "MAX" 144 and "MIN" 142 at each end of the rotational range. When the daylighting feature is enabled for a particular relay, the daylighting feature prevents lights associated with that particular relay from turning on when the monitored area is adequately illuminated by natural light. The amount of natural light required to adequately illuminate the monitored area is set by the daylight sensor level adjuster 140. If there is enough natural light in the monitored area regardless of occupancy and the daylight feature is enabled for a particular relay, the daylight feature holds the lights associated with that particular relay off. If there is not enough natural light in the monitored area and the daylight feature is enabled for a particular relay, the daylight feature allows the lights associated with that particular relay to turn on when occupied. In some exemplary embodiments, the daylight feature maintains the lights associated with the enabled relay off even if someone attempts to manually turn on those lights while there is sufficient daylight available. According to some exemplary embodiments, the daylighting feature allows the selection of which relays to control via daylighting when there are multiple relays supplying electricity to loads.

In one exemplary embodiment, the adjustment for the daylight sensor level adjuster 140 is infinite in between the "MAX" 144 and "MIN" 142 setting and is used to control a microprocessor's (not shown) interpretation of the signal received. Turning the daylight sensor level adjuster 140 towards the "MIN" 142 sign reduces the amount of ambient daylight required before turning on the light sources associated with the enabled relays. Conversely, turning the daylight sensor level adjuster 140 towards the "MAX" 144 sign increases the amount of ambient daylight required before turning on the light sources associated with the enabled relays. The functions for the "MAX" 144 and "MIN" 142 settings can be reversed in alternative exemplary embodiments.

The exemplary ultrasonic sensitivity level adjuster 150 is indicated by a "MAX" 154 and "MIN" 152 at each end of the rotational range. In one exemplary embodiment, the adjustment for the ultrasonic sensitivity level adjuster 150 is infinite in between the "MAX" 154 and "MIN" 152 setting and is used to control a microprocessor's (not shown) interpretation of the signal received. A lower sensitivity setting, turning the ultrasonic sensitivity level adjuster 150 towards the "MIN" 152 sign, reduces the distance and/or sensitivity at which motion is detected. When the exemplary ultrasonic sensitivity level adjuster 150 is pointing towards the "MIN" 152 position the occupancy sensing and energy indicating lighting control device 100 is operating at the lowest sensitivity for detecting occupancy using the ultrasonic sensor section 116. Conversely, when the exemplary ultrasonic sensitivity level adjuster 150 is in the "MAX" 154 position the occupancy sensing and energy indicating lighting control device 100 is operating at the maximum sensitivity for detecting occupancy using the ultrasonic sensor section 116.

The first dipswitch 162 and the second dipswitch 164 are associated with the time delay function of the occupancy sensor 110. When the first dipswitch 162 and the second dipswitch 164 are both in the down position, the time delay function is in auto mode, which is set at a ten minutes time delay. Thus, once the lights are turned on by the sensing of motion, the lights will stay on for an additional ten minutes after the last detected motion. Thereafter, the lights will turn off automatically. When the first dipswitch 162 is in the down position and the second dipswitch 164 is in the up position, the time delay function is set to a five minutes time delay. When the first dipswitch 162 is in the up position and the second dipswitch 164 is in the down position, the time delay function is set to a fifteen minutes time delay. When the first dipswitch 162 and the second dipswitch 164 are both in the up position, the time delay function is set to a thirty minutes time delay. Although exemplary time delay period have been provided with respect to the positioning of the first dipswitch 162 and the second dipswitch 164, different time delay periods can be associated with the positioning of the first dipswitch 162 and the second dipswitch 164 without departing from the scope and spirit of the exemplary embodiments. Additionally, although the positioning of the first dipswitch 162 and the second dipswitch 164 control the time delay function of the occupancy sensor 110, the positioning of greater or fewer dipswitches can be used to control the time delay function without departing from the scope and spirit of the exemplary embodiment. The default setting for the first dipswitch 162 and the second dipswitch 164 are to make the time delay function set into the auto mode.

The third dipswitch 166 and the fourth dipswitch 168 are associated with the activation function of the first relay and the second relay. As previously mentioned, the first on/off button 130 is associated with controlling the lights that are electrically coupled to the occupancy sensing and energy indicating lighting control device 100 via the first relay. Similarly, the second on/off button 132 is associated with controlling the lights that are electrically coupled to the occupancy sensing and energy indicating lighting control device 100 via the second relay. When the third dipswitch 166 is in the down position, the first relay is controlled automatically using the occupancy sensor 110. When the third dipswitch 166 is in the up position, the first relay is controlled manually and operates independently of the occupancy sensor 110. Similarly, when the fourth dipswitch 168 is in the down position, the second relay is controlled automatically using the occupancy sensor 110. When the fourth dipswitch 168 is in the up position, the second relay is controlled manually and operates independently of the occupancy sensor 110. The default settings for the third dipswitch 166 and the fourth dipswitch 168 are automatic and manual, respectively. Thus, when the end user enters the monitored area, only the lights associated with the first relay are turned on; thereby saving energy by not having the lights associated with the second relay turn on.

The fifth dipswitch 170 is associated with the PIR sensitivity of the occupancy sensing and energy indicating lighting control device 100. When the fifth dipswitch 170 is in the down position, the PIR sensitivity is at full, which is the highest sensitivity. When the fifth dipswitch 170 is in the up position, the PIR sensitivity is at fifty percent. Although two sensitivity levels are used in this exemplary embodiment, greater or fewer sensitivity levels can be used in alternative exemplary embodiments. Additionally, although a single dipswitch is used to control the PIR sensitivity, multiple dipswitches or other devices, such as a slide or dial, can be used to adjust the PIR sensitivity levels.

The sixth dipswitch 172 is associated with a walk-through mode feature of the occupancy sensing and energy indicating lighting control device 100. When the sixth dipswitch 172 is in the down position, the walk-through mode feature is disabled. When the sixth dipswitch 172 is in the up position, the walk-through mode feature is enabled. The walk-through mode feature maximizes energy savings by not leaving the lights on when it detects a person entering the monitored area. The occupancy sensor 110 switches the lights on when it detects a person entering the monitored area. When the walk-through mode feature is enabled and if the occupancy sensor 110 does not continue to detect motion twenty seconds following the initial activation, the occupancy sensing and energy indicating lighting control device 100 automatically goes to a shorter two minute time delay. Thus, if the occupancy sensor 110 still does not detect motion within two minutes, the light turn off. Although a time period of twenty seconds is used after initial activation of the lights, a greater or shorter time period can be used without departing from the scope and spirit of the exemplary embodiment. Additionally, although the occupancy sensing and energy indicating lighting control device 100 automatically goes to a shorter two minute time delay upon not detecting motion after initial activation, a greater or shorter time delay can be used without departing from the scope and spirit of the exemplary embodiment.

The seventh dipswitch 174 is associated with a energy savings feedback indicating mode feature of the occupancy sensing and energy indicating lighting control device 100. When the seventh dipswitch 174 is in the down position, the energy savings feedback indicating mode feature is enabled. When the seventh dipswitch 174 is in the up position, the energy savings feedback indicating mode feature is disabled. The energy savings feedback indicating mode feature provides a visual indicator of energy usage, thereby increasing end user awareness and reminding end users to take control of their lighting to maximize energy savings. According to an exemplary embodiment, when both loads are off, the energy savings feedback indicator 120 illuminates at one hundred percent intensity, or a high level of intensity. When either of the loads is on and the other load is off, the energy savings feedback indicator 120 illuminates at fifty percent intensity, or an intermediate intensity level. When both loads are on, the energy savings feedback indicator 120 is not illuminated or is illuminated very slightly. Although one exemplary embodiment for the energy savings feedback indicator 120 has been illustrated, other embodiments use alternative energy savings feedback indicators as previously described.

The eighth dipswitch 176 is associated with a bathroom mode feature of the occupancy sensing and energy indicating lighting control device 100. When the eighth dipswitch 176 is in the down position, the bathroom mode feature is disabled. When the eighth dipswitch 176 is in the up position, the bathroom mode feature is enabled. When the bathroom node feature is enabled, the second relay is kept on for an additional eight minutes after the first relay is turned off. One example for using the bathroom mode feature is to electrically couple the first relay of the occupancy sensing and energy indicating lighting control device 100 to a lighting load and the second relay of the occupancy sensing and energy indicating lighting control device 100 to a bathroom fan. Thus, after the end user has left the monitored area, the lights will turn off and the fan will turn off eight minutes thereafter. Although eight minutes is used for the period of time between the first relay turning off and the second relay turning off, the period of time can be increased or decreased without departing from the scope and spirit of the exemplary embodiment.

The ninth dipswitch 178 is associated with a relay swap mode feature of the occupancy sensing and energy indicating lighting control device 100. When the ninth dipswitch 178 is in the down position, the relay swap mode feature is normal. When the ninth dipswitch 178 is in the up position, the relay swap mode feature is enabled and the relays are swapped. When the relay swap mode feature is enabled, the performance of the on/off buttons 130 and 132 are switched. Thus, the first on/off button 130 controls the second relay, while the second on/off button control the first relay. This scenario is needed when the occupancy sensing and energy indicating lighting control device 100 is improperly installed and the first load 240 (FIG. 2) is mistakenly electrically coupled to the second relay and the second load 250 (FIG. 2) is mistakenly electrically coupled to the first relay. Instead of re-installing the occupancy sensing and energy indicating lighting control device 100 properly or confusing the end user if erred installation is not corrected, the relay swap mode feature is enabled to correct the erred installation and save time, costs, and/or inconveniences associated with fixing and/or using the occupancy sensing and energy indicating lighting control device 100.

The tenth dipswitch 180 and the eleventh dipswitch 182 are associated with the daylighting mode feature for the first relay and the second relay. When the tenth dipswitch 180 is in the down position, the daylighting mode feature for the first relay is disabled. When the tenth dipswitch 180 is in the up position, the daylighting mode feature for the first relay is enabled. Similarly, when the eleventh dipswitch 182 is in the down position, the daylighting mode feature for the second relay is disabled. When the eleventh dipswitch 182 is in the up position, the daylighting mode feature for the second relay is enabled. Thus, the tenth dipswitch 180 and the eleventh dipswitch 182 control enablement of the daylighting mode feature for the first relay and the second relay, while the daylight sensor level adjuster 140 controls the sensitivity of the daylighting mode feature.

FIG. 2 is a schematic block diagram of a dual level single circuit wiring diagram 200 using the occupancy sensing and energy indicating lighting control device 100 of FIG. 1A in accordance with an exemplary embodiment of the present invention. A hot building wire 205 and a neutral building wire 207 are routed to the wall box, where the occupancy sensing and energy indicating lighting control device 100 is electrically coupled to them. Additionally, a first load 240 and a second load 250 also are electrically coupled to the occupancy sensing and energy indicating lighting control device 100.

The occupancy sensing and energy indicating lighting control device 100 includes an electrical device first building hot wire contact 210, an electrical device second building hot wire contact 212, an electrical device building neutral wire contact 214, an electrical device ground wire contact 216, an electrical device first load hot wire contact 218, and an electrical device second load hot wire contact 220. An electrical device first hot wire 230 is electrically coupled to the electrical device first building hot wire contact 210 at one end, while its other end is electrically coupled to the building hot wire 205. An electrical device second hot wire 232 is electrically coupled to the electrical device second building hot wire contact 212 at one end, while its other end is electrically coupled to the building hot wire 205. The electrical coupling of the electrical device first hot wire 230, the electrical device second hot wire 232, and the building hot wire 205 is performed using a wire connector (not shown). An electrical device neutral wire 234 is electrically coupled to the electrical device building neutral wire contact 214 at one end, while its other end is electrically coupled to the building neutral wire 207. A wire connector is used to electrically couple the electrical device neutral wire 234 to the building neutral wire 207. An electrical device ground wire 236 is electrically coupled to the electrical device ground wire contact 216 at one end, while its other end is electrically coupled to a ground 260, which can be any grounding device known to people having ordinary skill in the art.

As previously mentioned, the occupancy sensing and energy indicating lighting control device 100 is electrically coupled to a first load 240 and a second load 250. A first load hot wire 242 is electrically coupled to the electrical device first load hot wire contact 218 at one end, while its other end is electrically coupled to the first load 240. A first load neutral wire 244 is electrically coupled to the building neutral wire 207 and the electrical device neutral wire 234 at one end, while its other end is electrically coupled to the first load 240.

A second load hot wire 252 is electrically coupled to the electrical device second load hot wire contact 220 at one end, while its other end is electrically coupled to the second load 250. A second load neutral wire 254 is electrically coupled to the building neutral wire 207 and the electrical device neutral wire 234 at one end, while its other end is electrically coupled to the second load 250. Although one exemplary method has been described for installing the occupancy sensing and energy indicating lighting control device 100 in a single circuit configuration, alternative installation configurations known to people having ordinary skill in the art can be used without departing from the scope and spirit of the exemplary embodiment. For example, greater or fewer wires can be used by coupling the wires in a different configuration.

Figure 3:
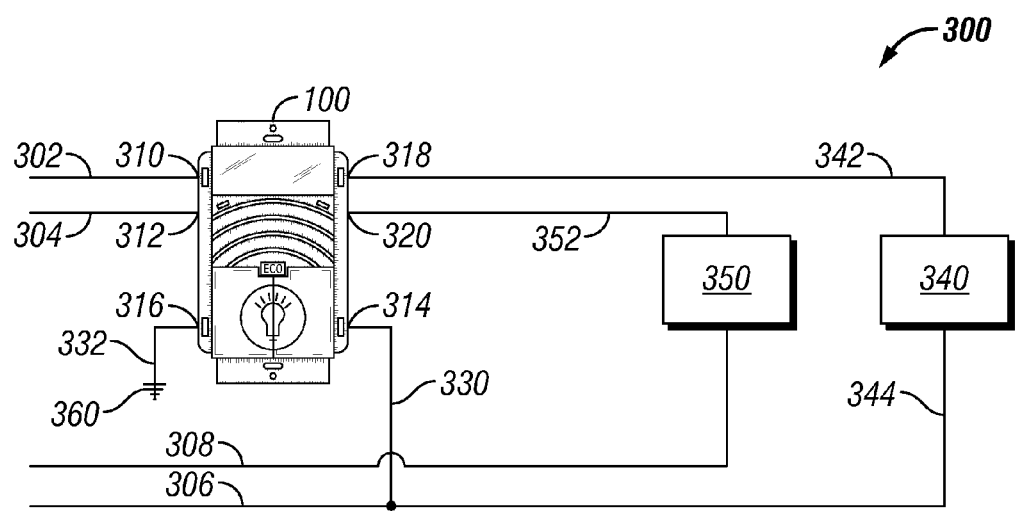
FIG. 3 is a schematic block diagram of a dual level dual circuit wiring diagram incorporating the lighting control device of FIG. 1A in accordance with an exemplary embodiment of the present invention.

FIG. 3 is a schematic block diagram of a dual level dual circuit wiring diagram 300 using the occupancy sensing and energy indicating lighting control device 100 of FIG. 1A in accordance with an exemplary embodiment of the present invention. A first circuit building hot wire 302, a second circuit building hot wire 304, and a first circuit building neutral wire 306 are routed to the wall box, where the occupancy sensing and energy indicating lighting control device 100 is electrically coupled to them. Additionally, a first load 340 and a second load 350 also are electrically coupled to the occupancy sensing and energy indicating lighting control device 100.

The occupancy sensing and energy indicating lighting control device 100 includes an electrical device first circuit building hot wire contact 310, an electrical device second circuit building hot wire contact 312, an electrical device building neutral wire contact 314, an electrical device ground wire contact 316, an electrical device first load hot wire contact 318, and an electrical device second load hot wire contact 320. The first circuit building hot wire 302 is electrically coupled to the electrical device first circuit building hot wire contact 310. Similarly, the second circuit building hot wire 304 is electrically coupled to the electrical device second circuit building hot wire contact 312. An electrical device neutral wire 330 is electrically coupled to the electrical device building neutral wire contact 314 at one end, while its other end is electrically coupled to the first circuit building neutral wire 306. A wire connector is used to electrically couple the electrical device neutral wire 330 to the first circuit building neutral wire 306. An electrical device ground wire 332 is electrically coupled to the electrical device ground wire contact 316 at one end, while its other end is electrically coupled to a ground 360, which can be any grounding device known to people having ordinary skill in the art.

As previously mentioned, the occupancy sensing and energy indicating lighting control device 100 is electrically coupled to the first load 340 and the second load 350. A first load hot wire 342 is electrically coupled to the electrical device first load hot wire contact 318 at one end, while its other end is electrically coupled to the first load 340. A first load neutral wire 344 is electrically coupled to the first circuit building neutral wire 306 and the electrical device neutral wire 330 at one end, while its other end is electrically coupled to the first load 340.

A second load hot wire 352 is electrically coupled to the electrical device second load hot wire contact 320 at one end, while its other end is electrically coupled to the second load 350. A second circuit building neutral wire 308 is electrically coupled to the second load 350. Although one exemplary method has been described for installing the occupancy sensing and energy indicating lighting control device 100 in a dual circuit configuration, alternative installation configurations known to people having ordinary skill in the art can be used without departing from the scope and spirit of the exemplary embodiment. For example, greater or fewer wires can be used by coupling the wires in a different configuration.

Figure 4:
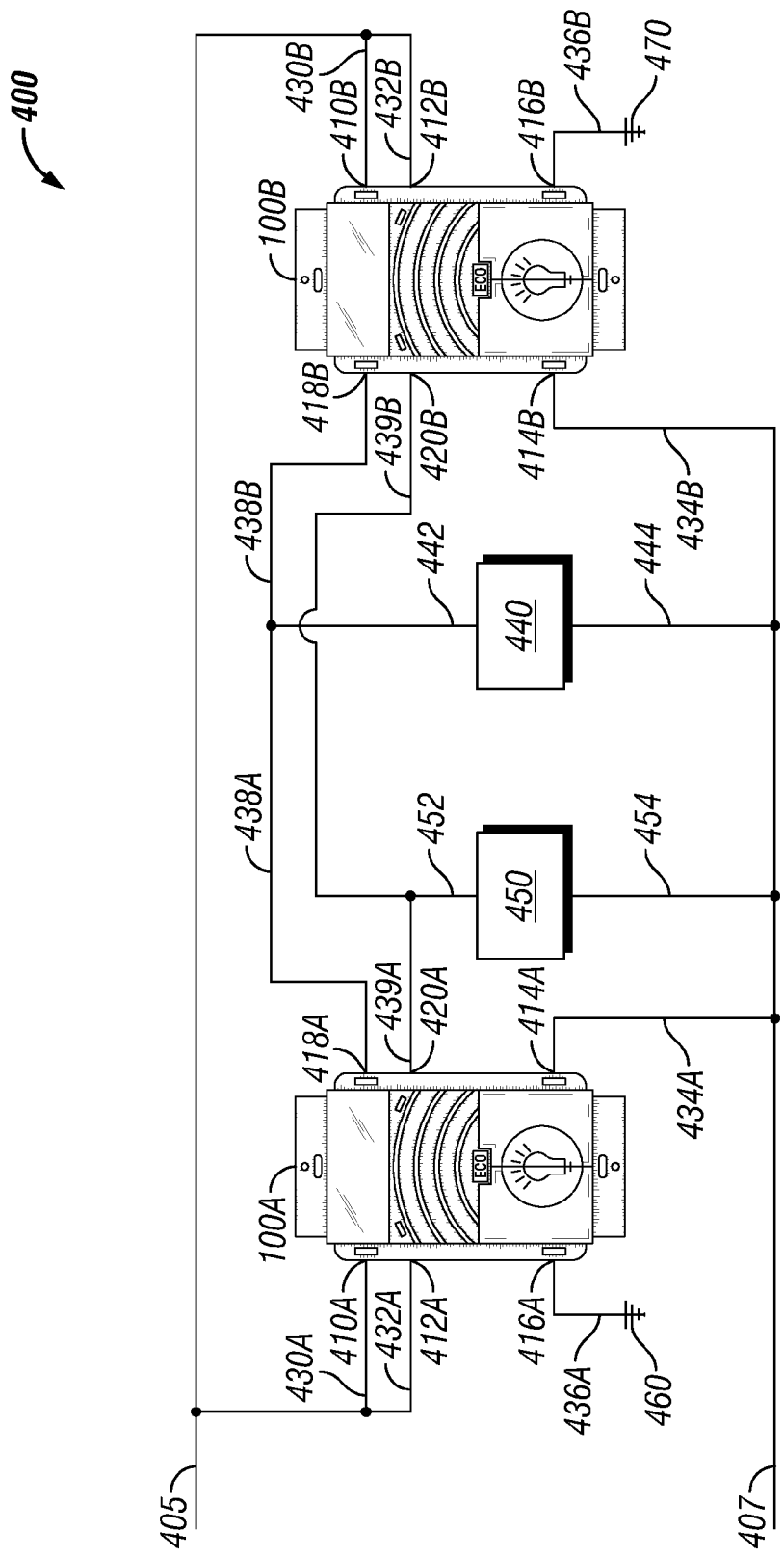
FIG. 4 is a schematic block diagram of a dual level single circuit three-way wiring diagram incorporating the lighting control device of FIG. 1A in accordance with an exemplary embodiment of the present invention.

FIG. 4 is a schematic block diagram of a dual level single circuit three-way wiring diagram 400 using the occupancy sensing and energy indicating lighting control device 100 of FIG. 1A in accordance with an exemplary embodiment of the present invention. A building hot wire 405 and a building neutral wire 407 are routed to the wall box, where a first occupancy sensing and energy indicating lighting control device 100A and a second occupancy sensing and energy indicating lighting control device 100B are electrically coupled to them. According to one exemplary embodiment, the first occupancy sensing and energy indicating lighting control device 100A and the second occupancy sensing and energy indicating lighting control device 100B are positioned in separate wall boxes. Additionally, a first load 440 and a second load 450 also are electrically coupled to the first occupancy sensing and energy indicating lighting control device 100A and the second occupancy sensing and energy indicating lighting control device 100B.

The first occupancy sensing and energy indicating lighting control device 100A includes a first electrical device first building hot wire contact 410A, a first electrical device second building hot wire contact 412A, a first electrical device building neutral wire contact 414A, a first electrical device ground wire contact 416A, a first electrical device first load hot wire contact 418A, and a first electrical device second load hot wire contact 420A. A first electrical device first hot wire 430A is electrically coupled to the first electrical device first building hot wire contact 410A at one end, while its other end is electrically coupled to the building hot wire 405. A first electrical device second hot wire 432A is electrically coupled to the first electrical device second building hot wire contact 412A at one end, while its other end is electrically coupled to the building hot wire 405. The electrical coupling of the first electrical device first hot wire 430A, the first electrical device second hot wire 432A, and the building hot wire 405 is performed using a wire connector (not shown). A first electrical device neutral wire 434A is electrically coupled to the first electrical device building neutral wire contact 414A at one end, while its other end is electrically coupled to the building neutral wire 407. A wire connector is used to electrically couple the first electrical device neutral wire 434A to the building neutral wire 407. A first electrical device ground wire 436A is electrically coupled to the first electrical device ground wire contact 416A at one end, while its other end is electrically coupled to a ground 460, which can be any grounding device known to people having ordinary skill in the art.

Similarly, the second occupancy sensing and energy indicating lighting control device 100B includes a second electrical device first building hot wire contact 410B, a second electrical device second building hot wire contact 412B, a second electrical device building neutral wire contact 414B, a second electrical device ground wire contact 416B, a second electrical device first load hot wire contact 418B, and a second electrical device second load hot wire contact 420B. A second electrical device first hot wire 430B is electrically coupled to the second electrical device first building hot wire contact 410B at one end, while its other end is electrically coupled to the building hot wire 405. A second electrical device second hot wire 432B is electrically coupled to the second electrical device second building hot wire contact 412B at one end, while its other end is electrically coupled to the building hot wire 405. The electrical coupling of the second electrical device first hot wire 430B, the second electrical device second hot wire 432B, and the building hot wire 405 is performed using a wire connector (not shown). A second electrical device neutral wire 434B is electrically coupled to the second electrical device building neutral wire contact 414B at one end, while its other end is electrically coupled to the building neutral wire 407. A wire connector is used to electrically couple the second electrical device neutral wire 434B to the building neutral wire 407. A second electrical device ground wire 436B is electrically coupled to the second electrical device ground wire contact 416B at one end, while its other end is electrically coupled to a ground 470, which can be any grounding device known to people having ordinary skill in the art.

As previously mentioned, the first occupancy sensing and energy indicating lighting control device 100A and the second occupancy sensing and energy indicating lighting control device 100B are electrically coupled to the first load 440 and the second load 450. A first electrical device first load hot wire 438A is electrically coupled to the first electrical device first load hot wire contact 418A at one end, while its other end is electrically coupled to the first load 440 using a first load hot wire 442. Similarly, a second electrical device first load hot wire 438B is electrically coupled to the second electrical device first load hot wire contact 418B at one end, while its other end is electrically coupled to the first load 440 also using the first load hot wire 442. The first load hot wire 442 is electrically coupled to the first load 440. A first load neutral wire 444 is electrically coupled to the building neutral wire 407, the first electrical device neutral wire 434A, a second load neutral wire 454, and the second electrical device neutral wire 434B at one end, while its other end is electrically coupled to the first load 440.

A first electrical device second load hot wire 439A is electrically coupled to the first electrical device second load hot wire contact 420A at one end, while its other end is electrically coupled to the second load 450 using a second load hot wire 452. Similarly, a second electrical device second load hot wire 439B is electrically coupled to the second electrical device second load hot wire contact 420B at one end, while its other end is electrically coupled to the second load 450 also using the second load hot wire 452. The second load hot wire 452 is electrically coupled to the second load 450. A second load neutral wire 454 is electrically coupled to the building neutral wire 407, the first electrical device neutral wire 434A, the first load neutral wire 444, and the second electrical device neutral wire 434B at one end, while its other end is electrically coupled to the second load 450.

FIG. 5 is a front elevation view of an occupancy sensing and energy indicating lighting control device 500 in accordance with another exemplary embodiment of the present invention. Referring to FIG. 5, the occupancy sensing and energy indicating lighting control device 500 includes an upper coupling band 590, a lower coupling band 592, an occupancy sensor 510, an energy savings feedback indicator 520, a demand response indicator 580, a manual controller 595, and a transceiver 582 for receiving signals. The occupancy sensor 510 includes a passive infrared ("PIR") sensor section 512 and an ultrasonic sensor section 516. Although the occupancy sensor 510 includes both the PIR sensor section 512 and the ultrasonic sensor section 516, the occupancy sensor 510 can include any one or a combination of different occupancy sensing technologies including, but not limited to, PIR, ultrasonic, microwave, and microphonic technologies. Thus, the occupancy sensing and energy indicating lighting control device 500 is similar to the occupancy sensing and energy indicating lighting control device 100 of FIGS. 1A-4, except that the occupancy sensing and energy indicating lighting control device 500 includes the demand response indicator 580 and the transceiver 582.

The demand response indicator 580 includes an LED and a lens positioned over the LED. The LED emits shades of blue light to indicate levels of demand response that is being experienced by a utility company. A demand response occurs during certain times of day when the utility company cannot supply energy at the level of the demand for the energy. During these times, the utility company sends out a signal to the users informing them to lower their electricity usage during those times. It is also at these times that the cost for electricity is at a premium. According to one embodiment, there are four levels of demand response, ranging from no demand response, small demand response, high demand response, and full demand response. The cost of electricity is at its lowest levels when the demand response indicator 580 indicates that there is a no demand response. The LED emits a faint blue light or no light when there is a no demand response. The cost of electricity is at slightly higher levels when the demand response indicator 580 indicates that there is a small demand response. The LED emits a low medium shade of blue light when there is a small demand response. The cost of electricity is at even higher levels when the demand response indicator 580 indicates that there is a high demand response. The LED emits a high medium shade of blue light when there is a high demand response. The cost of electricity is at it highest levels when the demand response indicator 580 indicates that there is a full demand response. The LED emits a bright blue light when there is a full demand response. Additionally, in certain exemplary embodiments, the demand response indicator 580 emits a variety of shades of blue light for demand responses occurring at any intermediate point between one hundred percent demand response and zero percent demand response. Although an LED emitting shades of blue light has been described for communicating different levels of demand responses, any color of light and its respective shades can be used without departing from the scope and spirit of the exemplary embodiment. Hence, the demand response indicator 580 provides awareness to the end user regarding demand responses that are occurring and provides the end user with opportunities for additional energy savings.

Although the demand response indicator 580 has been described as including an LED emitting shades of blue light according to one exemplary embodiment, the demand response indicator 580 includes one or more LEDs capable of emitting the full spectrum of visible light, or a portion of the full spectrum of visible light, through the lens in accordance with other exemplary embodiments. The color of the emitted light is dependent upon the demand response level that is occurring at that moment in time. For example, the demand response indicator 580 emits a green light representing a no demand response, a yellow light representing a small demand response, a purple light representing a high demand response, and a red light representing a full demand response. Although representative colors have been described for different levels of energy savings, any color or shades of color can represent different levels of demand responses without departing from the scope and spirit of the exemplary embodiment.

Although the demand response indicator 580 has been described as including an LED emitting shades of a single light color or one or more LEDs emitting the full spectrum of visible light, or a portion of the full spectrum of visible light, through the lens according to some of the exemplary embodiments, the demand response indicator 580 can include a display screen, as previously described, for communicating demand response information to the end user. For example, the display screen can display one or more words, one or more numbers, one or more symbols, one or more growing objects, or a combination of the aforementioned. According to still yet other exemplary embodiments, the demand response indicator 580 can be a device that produces an audible sound, in lieu of or in addition to the visible indicators previously described, to indicate different levels of demand responses.

The transceiver 582 extends outwardly from the top of the occupancy sensing and energy indicating lighting control device 500 in a vertical orientation. The transceiver 582 receives information from the utility company, which is then processed by a microprocessor. The information is then displayed on the demand response indicator 580. Although one type of transceiver 582 is illustrated, other types of information receiving devices, such as antennas, can be used without departing from the scope and spirit of the exemplary embodiment.

FIG. 6 is a front elevation view of an occupancy sensing and energy indicating lighting control device 600 in accordance with another exemplary embodiment of the present invention. Referring to FIG. 6, the occupancy sensing and energy indicating lighting control device 600 includes an upper coupling band 690, a lower coupling band 692, an occupancy sensor 610, an energy savings feedback indicator 620, and a manual controller 695. The occupancy sensor 610 includes a passive infrared ("PIR") sensor section 612 and an ultrasonic sensor section 616. Although the occupancy sensor 610 includes both the PIR sensor section 612 and the ultrasonic sensor section 616, the occupancy sensor 610 can include any one or a combination of different occupancy sensing technologies including, but not limited to, PIR, ultrasonic, microwave, and microphonic technologies. Thus, the occupancy sensing and energy indicating lighting control device 600 is similar to the occupancy sensing and energy indicating lighting control device 100 of FIGS. 1A-4, except that the manual controller 695 of the occupancy sensing and energy indicating lighting control device 600 includes a dimmer switch. Dimmer switches are known to people having ordinary skill in the art. According to some exemplary embodiments, a dimmer level indicator 685 also is included in the occupancy sensing and energy indicating lighting control device 600 so that the end user is informed as to what level the dimmer switch is operating at. These dimmer level indicators also are known to people having ordinary skill in the art.

Figure 7:
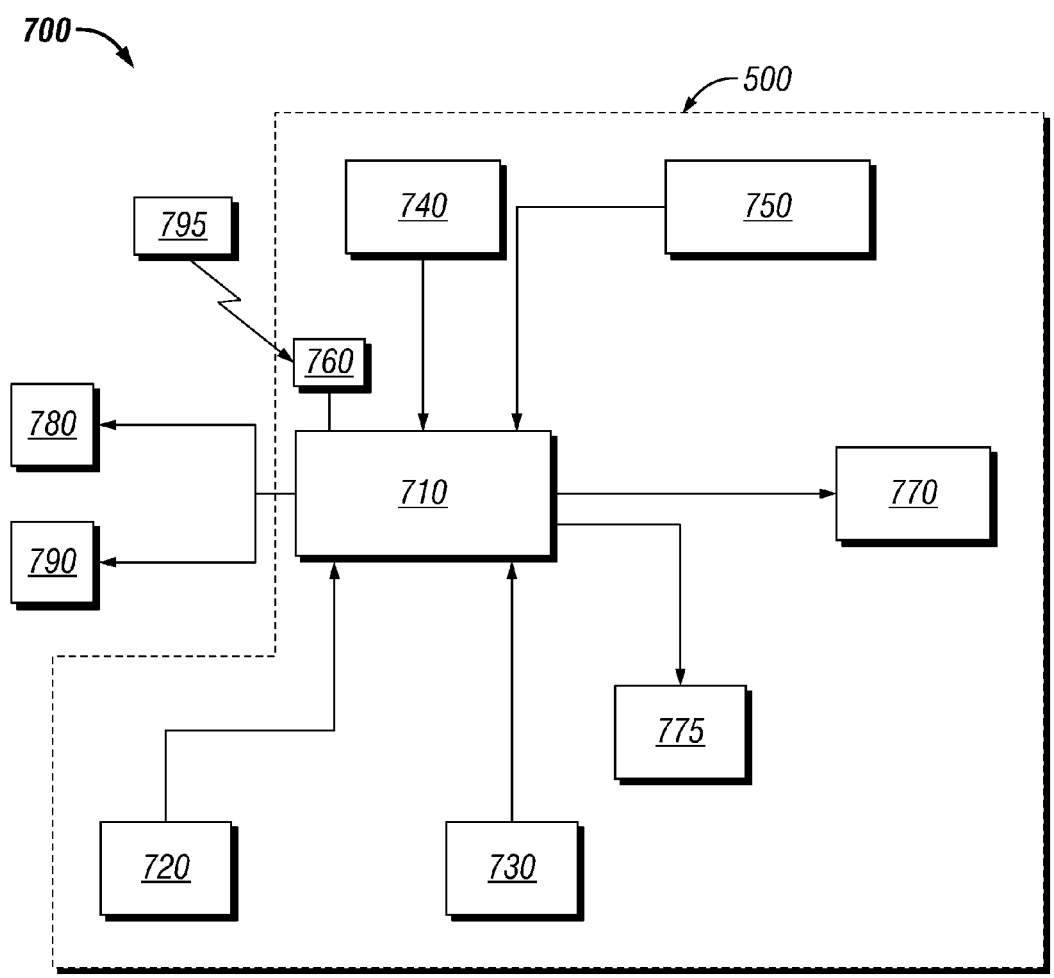
FIG. 7 is a schematic block diagram of a lighting control system using the lighting control device of FIG. 5 in accordance with an exemplary embodiment of the present invention.

FIG. 7 is a schematic block diagram of an occupancy sensing and energy indicating lighting control system 700 using the occupancy sensing and energy indicating lighting control device 500 of FIG. 5 in accordance with an exemplary embodiment of the present invention. Referring to FIG. 7, the occupancy sensing and energy indicating lighting control system 700 includes the occupancy sensing and energy indicating lighting control device 500, a first load 780, a second load 790, and an exterior unit 795. However, in alternate exemplary embodiments, the number of loads can be fewer or greater than two without departing from the scope and spirit of the exemplary embodiments. Additionally, in some exemplary embodiments, the exterior unit 795 is optional.

The occupancy sensing and energy indicating lighting control device 500 includes a microcontroller 710, a daylight sensor 720, an occupancy sensor 730, a manual controller 740, a settings controller 750, a transceiver 760, a feedback indicator 770, and a demand response indicator 775. In other exemplary embodiments, at least one of the daylight sensor 720, the transceiver 760, and the demand response indicator 775 is optional.

The microcontroller 710 receives information from one or more of the daylight sensor 720, the occupancy sensor 730, the manual controller 740, the settings controller 750, and the transceiver 760. The microcontroller 710 processes the information received and transmits one or more signals to one or more of the first load 780, the second load 790, the feedback indicator 770, and the demand response indicator 775.

The daylight sensor 720 is positioned within the occupancy sensing and energy indicating lighting control device 500 according to one exemplary embodiment; however, alternative exemplary embodiments can have the daylight sensor 720 positioned anywhere within the monitored area without departing from the scope and spirit of the exemplary embodiment. The daylight sensor 720 measures the amount of natural daylight present within the monitored area and sends the information to the microcontroller 710, either via a hardwire communication or via a wireless communication, for processing. Depending upon the settings of the settings controller 750, the microcontroller 710 can turn off one or more of the first load 780 and the second load 790 or can reduce the energy being supplied to one or more of the first load 780 and the second load 790 based upon the amount of natural daylight present within the monitored area regardless of the occupancy in the monitored area. This feature allows for reducing energy consumption. For example, if the monitored area is occupied and the amount of natural daylight meets or exceeds a desired set threshold, the microprocessor 710 reduces the energy sent to either or both the first load 780 and the second load 790. Additionally, the microprocessor 710 sends a signal to the feedback indicator 770 to inform the end user whether or not energy savings is occurring. The feedback indicator 770 operates according to the disclosure previously described.

The occupancy sensor 730 determines whether the monitored area is occupied and sends the information to the microcontroller 710, either via a hardwire communication or via a wireless communication, for processing. Depending upon the settings of the settings controller 750, the microcontroller 710 can turn on one or more of the first load 780 and the second load 790 when the monitored area is occupied. Alternatively, the microcontroller 710 can turn off one or more of the first load 780 and the second load 790 when the monitored area is no longer occupied. For example, if the monitored area is occupied, the microprocessor 710 turns on the first load 780 depending upon the settings of the setting controller 750 and maintains the second load 790 off until the second load 790 is turned on manually. Additionally, the microprocessor 710 sends a signal to the feedback indicator 770 to inform the end user whether or not energy savings is occurring. The occupancy sensor 730 and the feedback indicator 770 operate according to the disclosure previously described.

The manual controller 740 includes one or more of a switch, a dimmer, or a slide adjuster and allows for manually controlling the light levels of the first load 780 and the second load 790. The settings controller 750 includes one or more of dipswitches or dials and allows adjustments to be made for controlling how the occupancy sensing and energy indicating lighting control device 500, which includes sensitivity adjustments for the sensors and functioning adjustments for how the microcontroller 710 is to operate. The manual controller 740 and the settings controller 750 operate according to the disclosure previously described.

In some exemplary embodiments, the occupancy sensing and energy indicating lighting control device 500 includes the transceiver 760, which receives a signal from the external unit 795. The external unit 795 includes a utility company, service provider, other occupancy sensing and energy indicating lighting control devices, or any other device that can send signals regarding energy usage and/or demand response. The external unit sends a signal including information regarding energy usage and/or demand response to the transceiver 760, which then sends a signal to the microprocessor 710 for processing. In response to the signal, the microprocessor 710 sends a signal to one or more of the feedback indicator 770 and the demand response indicator 775. The feedback indicator 770 and the demand response indicator 775 operate according to the disclosure previously described.

Although each exemplary embodiment has been described in detail, it is to be construed that any features and modifications that are applicable to one embodiment are also applicable to the other embodiments. Furthermore, although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the exemplary embodiments. It should be appreciated by those of ordinary skill in the art that the conception and the specific embodiments disclosed may be readily utilized as a basis for modifying or designing other structures or methods for carrying out the same purposes of the invention. It should also be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

What is claimed is:

1. A load control device that supplies electricity to a plurality of loads, comprising:
    a microcontroller;
    an occupancy sensor communicably coupled to the microcontroller, the occupancy sensor sensing occupancy within a monitored area and sending a first signal to the microcontroller once the occupancy sensor detects occupancy; and
    an energy savings feedback indicator communicably coupled to the microcontroller,
    wherein the microcontroller turns on one or more of the loads electrically coupled to the device when occupancy within the monitored area is detected,
    wherein the energy savings feedback indicator receives a second signal from the microcontroller, the second signal being dependent upon an amount of energy savings occurring,
    wherein the energy savings feedback indicator provides energy savings information to an end user, and
    wherein the energy savings feedback indicator emits a high intensity light when each of the loads electrically coupled to the device is off, emits a medium intensity light when at least one of the loads electrically coupled to the device is on, and emits no light or a low intensity light when each of the loads electrically coupled to the device is on.

2. The load control device of claim 1, wherein the energy savings feedback indicator comprises at least one light emitting diode ("LED").

3. The load control device of claim 1, wherein the energy savings feedback indicator is capable of emitting light having various intensities of a desired color, the various intensities of the desired color indicating different levels of energy savings.

4. The load control device of claim 1, wherein the energy savings feedback indicator is capable of emitting a plurality of light colors, wherein each light color indicates a level of energy savings.

5. The load control device of claim 1, wherein the energy savings feedback indicator further comprises a display screen that displays at least one of words, numbers, symbols, and growing objects.

6. The load control device of claim 1, wherein the energy savings feedback indicator further provides an audible signal indicating different levels of energy savings.

7. The load control device of claim 1, further comprising:
    a transceiver communicably coupled to the microcontroller, the transceiver receiving a third signal from an external unit, the transceiver communicating the third signal to the microcontroller using a fourth signal; and a demand response indicator communicably coupled to the microcontroller, the demand response indicator receiving a fifth signal from the microcontroller, wherein the demand response indicator provides demand response information to the end user.

8. The load control device of claim 7, wherein the demand response indicator comprises at least one LED.

9. The load control device of claim 7, wherein the demand response indicator is capable of emitting light having various intensities of a desired color, the various intensities of the desired color indicating different levels of demand response.

10. The load control device of claim 7, wherein the demand response indicator is capable of emitting a plurality of light colors, wherein each light color indicates a level of demand response.

11. The load control device of claim 7, wherein the demand response indicator provides an audible signal indicating different levels of demand response.

12. The load control device of claim 1, further comprising a manual controller communicably coupled to the microcontroller, the manual controller controlling operation of at least one of the loads, wherein the manual controller is selected from a group consisting of a push button, a slide, a rocker, and a dimmer.

13. The load control device of claim 12, further comprising a dimmer level indicator.

14. The load control device of claim 1, further comprising a daylight sensor communicably coupled to the microcontroller, the daylight sensor sending a third signal to the microcontroller based upon an amount of natural daylight within the monitored area, wherein the microcontroller controls operation of the loads electrically coupled to the device in response to processing of the third signal.

15. A load control device that supplies electricity to a plurality of loads, comprising:

a microcontroller;

an occupancy sensor communicably coupled to the microcontroller, the occupancy sensor sensing occupancy within a monitored area and sending a first signal to the microcontroller once the occupancy sensor detects occupancy; and an energy savings feedback indicator communicably coupled to the microcontroller, wherein the microcontroller turns on one or more of the loads electrically coupled to the device when occupancy within the monitored area is detected, wherein the energy savings feedback indicator receives a second signal from the microcontroller, the second signal being dependent upon an amount of energy savings occurring, wherein the energy savings feedback indicator provides energy savings information to an end user, and wherein the energy savings feedback indicator emits a first light color when each of the loads electrically coupled to the device is off, emits a second light color when at least one of the loads electrically coupled to the device is on, and emits a third light color when each of the loads electrically coupled to the device is on.

16. A load control system, comprising:

a plurality of loads positioned within a monitored area; and a load control device electrically coupled to the loads, wherein the load control device comprises:

a microcontroller;

an occupancy sensor communicably coupled to the microcontroller, the occupancy sensor sensing occupancy within the monitored area and sending a first signal to the microcontroller once the occupancy sensor detects occupancy; and an energy savings feedback indicator communicably coupled to the microcontroller, wherein the microcontroller turns on at least one of the loads electrically coupled to the device when occupancy within the monitored area is detected, wherein the energy savings feedback indicator receives a second signal from the microcontroller, the second signal being dependent upon an amount of energy savings occurring, wherein the energy savings feedback indicator provides energy savings information to an end user, and wherein the energy savings feedback indicator emits a high intensity light when each of the loads electrically coupled to the device is off, emits a medium intensity light when at least one of the loads electrically coupled to the device is on, and emits no light or a low intensity light when each of the loads electrically coupled to the device is on.

17. The load control system of claim 16, wherein the energy savings feedback indicator is capable of emitting light having various intensities of a desired color, the various intensities of the desired color indicating different levels of energy savings.

18. The load control system of claim 16, wherein the energy savings feedback indicator is capable of emitting a plurality of light colors, wherein each light color indicates a level of energy savings.

19. The load control system of claim 16, wherein the load control device further comprises:

a transceiver communicably coupled to the microcontroller, the transceiver receiving a third signal from an external unit, the transceiver communicating the third signal to the microcontroller using a fourth signal; and a demand response indicator communicably coupled to the microcontroller, the demand response indicator receiving a fifth signal from the microcontroller, wherein the demand response indicator provides demand response information to the end user.

20. The load control system of claim 19, wherein the demand response indicator is capable of emitting light having various intensities of a desired color, the various intensities of the desired color indicating different levels of demand response.

21. The load control system of claim 19, wherein the demand response indicator is capable of emitting a plurality of light colors, wherein each light color indicates a level of demand response.

22. A load control system, comprising:

a plurality of loads positioned within a monitored area; and a load control device electrically coupled to the one or more loads, wherein the load control device comprises:

a microcontroller;

an occupancy sensor communicably coupled to the microcontroller, the occupancy sensor sensing occupancy within the monitored area and sending a first signal to the microcontroller once the occupancy sensor detects occupancy; and an energy savings feedback indicator communicably coupled to the microcontroller, wherein the microcontroller turns on at least one of the loads electrically coupled to the device when occupancy within the monitored area is detected, wherein the energy savings feedback indicator receives a second signal from the microcontroller, the second signal being dependent upon an amount of energy savings occurring, wherein the energy savings feedback indicator provides energy savings information to an end user, and wherein the energy savings feedback indicator emits a first light color when each of the loads electrically coupled to the device is off, emits a second light color when at least one of the loads electrically coupled to the device is on, and emits a third light color when each of the loads electrically coupled to the device is on.

23. A method for indicating a level of energy savings in a load control system, comprising:

detecting, by an occupancy sensor of a load control device, occupancy within a monitored area;

turning on, by a microcontroller of the load control device, at least one of a plurality of loads electrically coupled to the load control device, when occupancy within the monitored area is detected by the occupancy sensor; and providing, by an energy savings feedback indicator of the load control device, an indication of energy savings to an end user based upon an amount of electricity that is being saved, wherein the providing comprises emitting a high intensity light when each of the loads electrically coupled to the device is off, emitting a medium intensity light when at least one of the loads electrically coupled to the device is on, and emitting no light or a low intensity light when each of the loads electrically coupled to the device is on.

24. The method of claim 23, wherein the providing comprises emitting light having various intensities of a desired color, the various intensities of the desired color indicating different levels of energy savings.

25. The method of claim 23, wherein the providing comprises emitting a plurality of light colors, wherein each light color indicates a level of energy savings.

26. The method of claim 23, further comprising:

receiving, by a transceiver, a signal from an external unit and communicating the signal to the microcontroller; and providing demand response information to the end user based on the signal from the external unit.

27. The method of claim 26, further comprising indicating different levels of demand response by emitting light having various intensities of a desired color.

28. The method of claim 26, further comprising indicating a level of demand response by emitting one of a plurality of light colors.

29. A load control device that indicates power savings, comprising:

an occupancy sensor that detects occupancy within a monitored area;

a microcontroller that turns on at least one of a plurality of loads electrically coupled to the device when occupancy within the monitored area is detected by the occupancy sensor;

an energy savings feedback indicator that, based on a control signal from the microcontroller, indicates an amount of energy savings to an end user by emitting a high intensity light when each of the loads electrically coupled to the device is off, emitting a medium intensity light when at least one of the loads electrically coupled to the device is on, and emitting no light or a low intensity light when each of the loads electrically coupled to the device is on.

30. A load control device that indicates power savings, comprising:

an occupancy sensor that detects occupancy within a monitored area;

a microcontroller that turns on at least one of a plurality of loads electrically coupled to the device when occupancy within the monitored area is detected by the occupancy sensor;

an energy savings feedback indicator that, based on a control signal from the microcontroller, indicates an amount of energy savings to an end user by emitting a first light color when each of the loads electrically coupled to the device is off, emitting a second light color when at least one of the loads electrically coupled to the device is on, and emitting a third light color when each of the loads electrically coupled to the device is on.

* * * * *